Oct. 25, 1932.  D. H. KILLEFFER  1,883,937
REFRIGERATIVE APPARATUS
Filed March 2, 1929
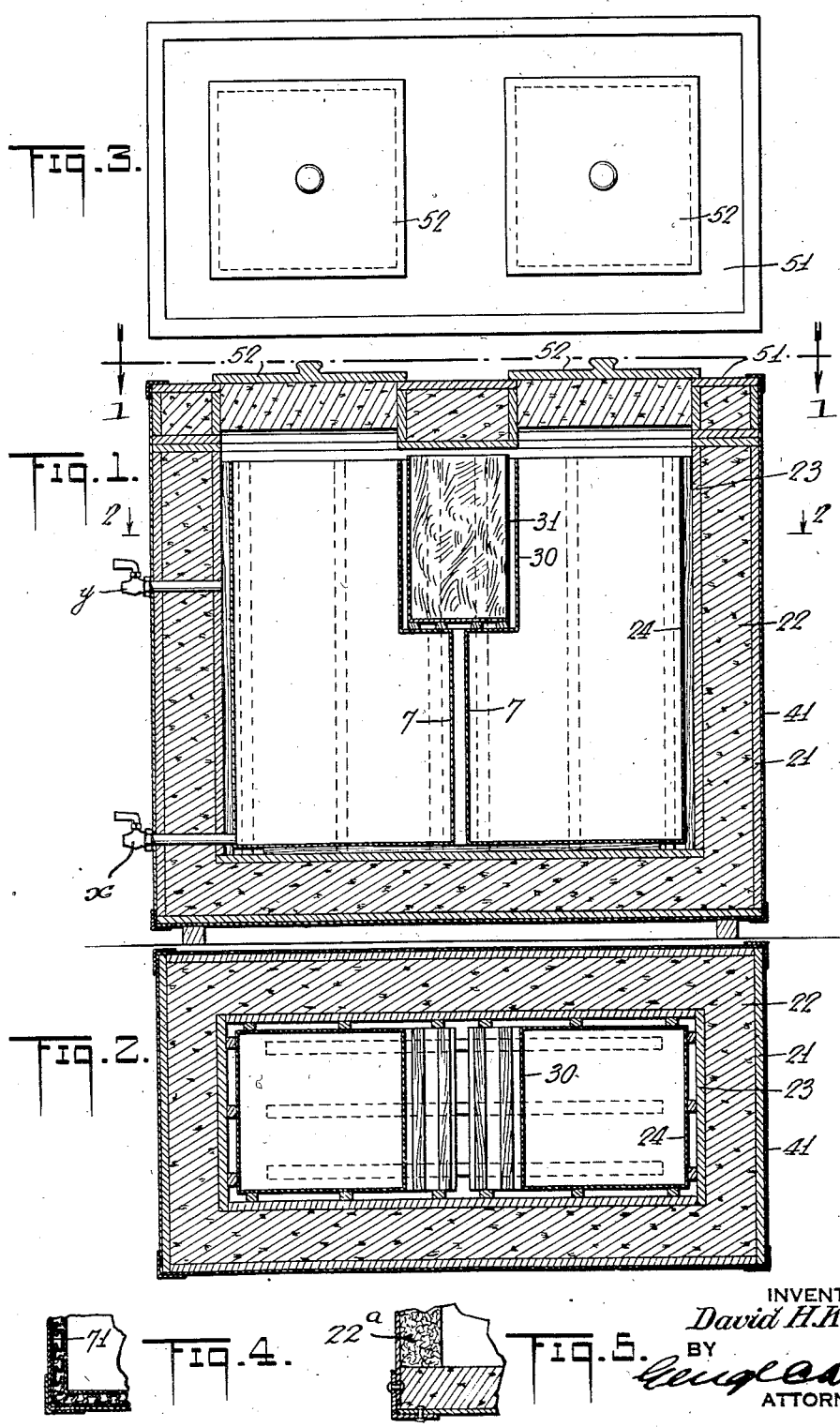
INVENTOR
David H. Killeffer
BY
ATTORNEY Patented Oct. 25, 1932

1,883,937

UNITED STATES PATENT OFFICE

DAVID H. KILLEFFER, OF YONKERS, NEW YORK, ASSIGNOR TO DRYICE EQUIPMENT CORPORATION, OF NEW YORK, N. Y., A CORPORATION OF DELAWARE

REFRIGERATIVE APPARATUS

Application filed March 2, 1929. Serial No. 343,859.

My present invention relates to insulating containers for solid carbon dioxide used merely for storage of the latter or for utilizing it as the refrigerant for other products enclosed in the container. The ordinary commercial container or refrigerator for such purposes, even though carefully constructed, is not gas-tight, because of holes, cracks, etc. A container may be well enough made so that it is practically water-tight without being tight enough to prevent creeping through of large quantities of carbon dioxide gas. In such a box or container, the cold gas evaporated from the solid carbon dioxide will find its way out, particularly through low level leaks. Naturally the outflow of the heavy gas at the lower levels tends to suck in air through any leaks in the upper part of the box or package. I have discovered that this will happen even where the containers are water-tight, and it is evident that a stagnant atmosphere of relatively pure carbon dioxide gas cannot be maintained in such packages.

Moreover, I have discovered that even where the walls and corners of the container are structurally perfect, that is, free from even small holes or cracks, the material of which the walls are made is remarkably permeable to in and out breathing of gas, and that the gas oozes out and air oozes in at a rate which is often surprisingly high. This is true where the container is made of hard wood, balsa wood, compressed cork, paper-board, etc. Moreover, similar leakage occurs in lesser degree through many materials supposed to be gas-proof as well as water-proof. Carbon dioxide gas in particular will leak with unexpected rapidity through most paint coatings, varnishes, paraffines, rubber solutions, etc. Rubber walls, in particular, operate rapidly to transfer carbon dioxide therethrough, to air in contact with the opposite surface thereof.

My present invention involves the discovery that the rate of evaporation of the solid carbon dioxide may be predetermined or controlled to a remarkable degree by certain materials which I have discovered that will operate to gas-proof the box or container to any desired degree. In those cases where it is desired that the carbon dioxide melt relatively rapidly, the gas-proofing is relatively least. In those cases where it is desired that the carbon dioxide melt relatively slowly, the gas-proofing is greatest. In the more important cases, however, where it is desired to make the melting rate as slow as possible, I have discovered that the value of the insulating cellular material, wood, cork, kapok, etc., constituting the walls of the container, and the prevention of inleak of air as above described, will far more than compensate for the expense of completely enveloping the bottom and walls of the container with material that is absolutely impervious to carbon dioxide gas. Even the best conducting material, such as sheet metal, can be employed to great advantage for this purpose. Though not so completely impermeable, asphalt is cheaper and lighter and affords a very good practical substitute. With the entire container thus proofed against gravity leakage, control leaks may be employed if desired, as for instance, a manually or automatically controlled drain from the bottom or any low level point in the container. Such drainage of the heavy carbon dioxide gas at the bottom operates to suck in air at the top, and any increase of air percentage has an accelerating effect equal to the same percentage of vacuum.

Conversely when all drainage is absolutely prevented, the entire interior, including the solid carbon dioxide, is submerged in a substantially pure atmosphere of the carbon dioxide, circulation is at a minimum, and evaporation is at a minimum.

The above and other matters relating to my present invention may be more fully understood from the following description in connection with the accompanying drawing, in which Fig. 1 is a characteristic vertical section, illustrating an insulating casing in connection with which my present invention may be employed;

Fig. 2 is a section on the line 2, 2, Fig. 1 the solid carbon dioxide container being removed;

Fig. 3 is a section on the line 4, 4, Fig. 3;

Fig. 4 is a fragmentary detail of a modification; and

Fig. 5 is a fragmentary detail of another modification.

In Figs. 1, 2 and 3, I have shown my invention as applied to an insulating container, comprising an outer box 21 of hard wood adapted to afford physical strength and protection for a heavy insulating lining 22, which may be balsa wood, corkboard or compressed kapok. This insulating material may or may not be protected by an inner wooden lining 23, since, as I have discovered, the joints and the material of such a casing afford astonishingly small barrier to the passage of gas into and through the insulation 22 and the hard wood of the outer casing 21. The inner metal can structure 24 is gas-tight, and supported away from the walls of the insulating casing so as to leave an interspace for the circulation of the dry carbon dioxide gas. It affords two separate containers for ice cream cans or other devices or materials to be refrigerated; a bunker 30 containing metal box 31 in which the solid carbon dioxide is placed and out of the top of which the gas therefrom flows through the interspace between 30 and 31 and between the walls of hollow partition 7, 7.

In this structure the solid carbon dioxide box is closed gas-tight on four sides, but the bunker 30 in which it is contained, is open at the ends. Consequently, where the gas overflows the top of the box 31, it is free to flow not only down through partition 7, 7, but also endwise directly into the front and rear circulatory spaces. This provision is desirable because of the proportions of the device which render the front and back wall area twice as great as that of the end walls.

As shown, the top of the refrigerator is closed in by a removable cover 51, which is shown as provided with service manholes with removable insulating covers 52. In this case the entire cover may be removed for replenishing the solid carbon dioxide in the box 31, but obviously the cover may be proportioned so that there could be a third manhole and plug cover for this purpose.

It will be understood that I have elected to describe my invention in connection with the above container, because it happens to be the form with which I was experimenting when I made the discoveries leading to my present invention. It will be understood that the entire device was carefully built to be as gas-tight as possible, but for some reason which was then mysterious, tests showed that when this device was used for storage of ice cream, the interior atmosphere only averaged 25% to 35% carbon dioxide, approximately two-thirds to three-fourths of the circulating atmosphere being air. The air is of course a relatively poor insulating medium as compared with carbon dioxide, besides having the evaporative effect of a vacuum equal to 20 to 23 inches of mercury, with respect to the solid. Other tests showed that it required 8 to 9 pounds of the compressed solid carbon dioxide per 5 gallons of ice cream per 24 hours. A careful checking up showed that this mostly resulted from gravity drainage of the heavy carbon dioxide gas oozing outward, through the substances of the insulating walls. In order to check the oozing, I tried various waterproof, air-proof materials as an interior lining and also as an exterior lining, in most cases with very little improvement. Thereupon, I made a series of tests showing that very few materials are impermeable to carbon dioxide, while others have varying degrees of permeability. The materials that can be classed as impermeable are metal plates, sheets or foil, mica, glass, and bakelite. As coating materials, certain varieties of bakelite, varnish or lacquer were found substantially impermeable. Slightly permeable materials are vaseline, asphalt and paraffin, in the order named. Still more permeable substances in the order named, are shellac, paints and varnishes, linseed oil, rubber, glue, paper, water-glass, soap, metal silicates, metal insoluble soaps, etc.

Metal is, of course, undesirable on account of its expense and because it is such a good conductor of heat; but ultimately I found it the most efficient and for many purposes the most practical material, particularly when employed as an external envelope or container having all of the cellular insulating material enclosed therein so that the latter material may be thoroughly soaked with and purged by the dry carbon dioxide gas and yet none of the gas can escape except by high level overflow at the top, where it will tend to force out instead of suck in air.

Thereupon, I encased the outer container 21 in the gas-tight container 41, which extends to a level, preferably above the top of the insulating casing 21, and preferably above the top of the cover 51. In this situation, the entire insulating container is, so to speak, within and below the level of the impervious container 41. Consequently, the dry carbon dioxide gas must completely submerge it before it can overflow into the outside air.

Thus arranged, the dry gas flowing in the interspace between the lining 23 and the container 24 readily oozes through the inner lining 23, the insulating material 22 and the protective wood casing 21, but further escape is absolutely blocked by the gas-tight outer container. Consequently, in this structure there will be a circulation of gas in the insulating material 22 similar to and in parallel with the free flow through the interspaces between 23 and 24, but none of the gas can really escape to the outside except by flowing over the top lip of the outer sheathing 41.

Notwithstanding the fact that the metal is such a good conductor, the result was remarkable. The percentage of gas in the mixture escaping from the top of the interspace between 23 and 24 was found to be 95% and the percentage found in the space between the outer casing 41 and the hardwood casing 21 was abount the same. The amount of solid carbon dioxide required per 5 gallons of ice cream per 24 hours was decreased from 8 or 9 pounds to 3 or 4 pounds. The temperature in the downflow column 7, 7, was found to be about 40° below zero F., the temperature at the top overflow about 8° above zero F., the outside atmospheric temperature averaging about 70° F.

Tests with other materials showed that with an asphalt lining the internal atmosphere instead of being 25% to 35% $CO_2$ became 35% to 50% $CO_2$. With vaseline the range was raised up to 60% to 70% $CO_2$.

A cheaper but equally effective material for an exterior coating is very thin foil either of pure zinc or lead tin heavily asphalted on one or both faces to give it strength. The container may be encased in this, the corners and edges being sealed or reenforced with asphalt or bakelite lacquer, which in turn may be protected by angle iron 61 laid on before the asphalt or lacquer has set. The joint between the outer casing and the cover may be similarly sealed and protected.

While I have discussed my invention in connection with the particular apparatus to which it was first applied, namely, ice cream cabinet having a special arrangement of thermosiphon circulation, it will be evident that the invention is even more applicable to a simple chest or box of balsa wood or the like, used for storage of solid carbon dioxide, the latter then being both the refrigerant and the refrigerated product. In such case the interior circulation may be controlled or modified in any known or desired way.

A very cheap and useful application of the principles of my invention is illustrated in Fig. 4, where I have shown a fragment of a carton made from ordinary corrugated board. In this case, a layer of asphalt paper, 71, is interposed between the corrugated filler and the exterior paper sheet to which it is secured. This leaves the corrugated structure free for penetration by the carbon dioxide gas, but prevents its escape to the exterior.

In Fig. 5 I have shown the other extreme, where the exterior metal case furnishes substantially all of the structural strength of the container, the insulation being effected by the interior cellular material 22a which may be compressed cork board or kapok, or the bottom may be cork and the sides kapok, as indicated.

While I have shown structures in which the carbon dioxide gas is discharged into the refrigerating space after it has operated on the insulating walls, it will be evident, that the gas may be closed off from access to said space and vented directly outside as in Martin application Ser. No. 324,639.

It is evident that the principles of construction and operation herein disclosed may be embodied in other structures adapted for special uses, as for instance, transportation containers, motor trucks, tricycles, freight cars, refrigerator cars and the like.

Where the exterior metal container 41 is strong enough, the hard wood casing 21 may be omitted, as well as the inner lining 23; and kapok may be used for part or all of the insulating material 23.

Obviously, also, an exterior protective casing of any desired material or construction may be used to protect any of the impervious casing materials that encase the cellular insulation.

The casing 41 being so impermeable to air, the above described vacuum-like accelerating effect may result in too slow a sublimating rate to afford sufficient refrigeration to take care of specific conditions or uses. In such case the gas may be drained off either from a low level of the refrigerated space, as by valve $x$, or from a higher level as by valve $y$, and either valve may drain from the upflow leg of the thermo circulation or from the refrigerated space.

I claim:—

1. A refrigerative container comprising a casing of material substantially impermeable to carbon dioxide gas, formed to permit escape of gas only by outflow from a high level, a second container arranged within the casing and located at a high level holding solid carbon dioxide evolving gas to fill said casing, said second container being substantially impermeable to carbon dioxide gas so that gas evolved from the solid carbon dioxide can escape only by overflow, and penetrable cellular insulating material protecting the inner surfaces of said casing below the high overflow level and disposed so that it must be pentrated by said gas before the gas can reach said casing.

2. A refrigerative container comprising a casing of metal impermeable to carbon dioxide gas, formed to permit escape of gas only by outflow from a high level, a second container arranged within the casing and located at a high level holding solid carbon dioxide evolving gas to fill said casing, said second container being substantially impermeable to carbon dioxide gas so that gas evolved from the solid carbon dioxide can escape only by overflow, and penetrable cellular insulating material protecting the inner surfaces of said casing below the high overflow level and disposed so that it must be penerated by said gas before the gas can reach said casing.

3. A refrigerator comprising an outer hard wood container, a thick inner lining of cellular insulating material and within the latter, spaced apart from the walls thereof, an inner metal container for the products to be refrigerated, a high level bunker for solid carbon dioxide arranged for high level downflow therefrom into the interspace whereby circulation of the gas in contact with the insulating walls is effected, upward along the inner surface of said insulating material, the bottom and sides of said outer casing being protected by an impenetrable layer of gas-tight metal so that gas can escape from the refrigerated space or from the insulation only by high level overflow.

4. A refrigerator comprising a metal container having bottom and side walls enclosing a space to be refrigerated, a high level bunker for solid carbon dioxide exterior to said container arranged for gravity downflow of gas in heat exchange relation therewith, an exterior enclosing container of cellular insulating material spaced apart from said bottom and side walls of said inner container to afford a circulatory interspace into which said gas flows downward and then upward in contact and permeating relation to the side walls of said container, the bottom and sides of said outer casing being protected by an impenetrable layer of gas-tight metal so that gas can escape from the refrigerated space or from the insulation only by high level overflow.

Signed at New York in the county of New York, and State of New York this 28th day of February, A. D. 1929.

DAVID H. KILLEFFER.